(12) United States Patent
Molesky et al.

(10) Patent No.: US 9,164,965 B2
(45) Date of Patent: Oct. 20, 2015

(54) INTERACTIVE TOPOLOGICAL VIEWS OF COMBINED HARDWARE AND SOFTWARE SYSTEMS

(71) Applicants: Lory Molesky, Lexington, MA (US); Constantina Marshman, Amherst, NH (US); Jeremy Smoler, Somerville, MA (US); Larry Guros, Derry, NH (US); David Teeven, Northborough, MA (US); Janice Schwartz, Hollis, NH (US)

(72) Inventors: Lory Molesky, Lexington, MA (US); Constantina Marshman, Amherst, NH (US); Jeremy Smoler, Somerville, MA (US); Larry Guros, Derry, NH (US); David Teeven, Northborough, MA (US); Janice Schwartz, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 272 days.

(21) Appl. No.: 13/630,752

(22) Filed: Sep. 28, 2012

(65) Prior Publication Data
US 2014/0096058 A1 Apr. 3, 2014

(51) Int. Cl.
G06F 3/0481 (2013.01)
G06F 17/21 (2006.01)

(52) U.S. Cl.
CPC .................... *G06F 17/211* (2013.01)

(58) Field of Classification Search
CPC ..... G06F 3/048; G06F 3/0481; G06F 3/0482; G06F 9/44543; G06F 8/34; G06F 3/04847; G06F 3/00; H04N 1/00424; H04N 1/00429

USPC ......... 715/764, 765, 771, 781, 810, 835, 853, 715/854; 707/705, 736, 737, 752, 754, 797, 707/798, 805
See application file for complete search history.

(56) References Cited

U.S. PATENT DOCUMENTS

| | | | |
|---|---|---|---|
| 6,253,195 B1 * | 6/2001 | Hudis et al. | 707/713 |
| 2004/0139193 A1 * | 7/2004 | Refai et al. | 709/224 |
| 2004/0215764 A1 | 10/2004 | Allen et al. | |
| 2007/0245261 A1 * | 10/2007 | Bukovec et al. | 715/810 |
| 2011/0022973 A1 * | 1/2011 | Craig et al. | 715/764 |
| 2011/0078594 A1 * | 3/2011 | Guertler et al. | 715/763 |
| 2011/0283207 A1 * | 11/2011 | Pena et al. | 715/763 |
| 2012/0005243 A1 * | 1/2012 | Van der Merwe et al. | 707/812 |
| 2012/0210252 A1 * | 8/2012 | Fedoseyeva et al. | 715/753 |
| 2013/0179471 A1 * | 7/2013 | Brad | 707/796 |

* cited by examiner

*Primary Examiner* — Xiomar L Bautista
(74) *Attorney, Agent, or Firm* — Osha • Liang LLP (57) ABSTRACT

A method and system for visualizing a system. The method includes obtaining a context managed entity from a client system, wherein the context managed entity corresponds to software executing on a computer system, querying a managed entity repository to obtain a plurality of managed entities linked to the context managed entity, wherein the plurality of managed entities comprises a software managed entity and a hardware managed entity, and generating a node in a topology model object for each of the plurality of managed entities. The method further includes generating a link object in the topology model object for each link between managed entities in the plurality of managed entities and rendering a topology graph comprising each node and each link object in the topology model object.

20 Claims, 12 Drawing Sheets

Topology Model Object
500

| Node | Unique Identifier | Type | Status | Parentage | Tier |
|---|---|---|---|---|---|
| 1 | AdminServer | Middleware | OK | acolp_345.example.com | Middleware |
| 2 | acolp_345.example.com | Middleware Host | OK | Null | Middleware |
| 3 | tuipl_451.example.com | Middleware Host | OK | Null | Middleware |
| 4 | gremp_937.example.com | Middleware Host | OK | Null | Middleware |
| 5 | drift_821.example.com | Database Host | OK | Null | Database |
| 6 | blins_847.example.com | Database Host | Error | Null | Database |
| 7 | nocke_691.example.com | Database Host | OK | Null | Database |
| 8 | mds-ApplicationMDSDB | Application | OK | AdminServer | Middleware |
| 9 | mds-CustomPortalDS | Application | OK | AdminServer | Middleware |
| 10 | mds-CustomServicesProducerDS | Application | OK | AdminServer | Middleware |
| 11 | mds-ESS_MDS_DS | Application | OK | AdminServer | Middleware |
| 12 | mds-owsm | Application | OK | AdminServer | Middleware |
| 13 | mds-soa | Application | OK | AdminServer | Middleware |

| Link | Source Node | Destination Node |
|---|---|---|
| 1 | tuipl_451.example.com | drift_821.example.com |
| 2 | tuipl_451.example.com | blins_847.example.com |
| 3 | tuipl_451.example.com | nocke_691.example.com |
| 4 | gremp_937.example.com | blins_847.example.com |
| 5 | gremp_937.example.com | nocke_691.example.com |
| 6 | acolp_345.example.com | drift_821.example.com |
| 7 | acolp_345.example.com | blins_847.example.com |

INTERACTIVE TOPOLOGICAL VIEWS OF COMBINED HARDWARE AND SOFTWARE SYSTEMS

BACKGROUND

Modern enterprise-level server systems can include a number of different components that interact with each other. Such components include many different types of hardware components and many different types of software components. System administrators must constantly monitor the interactions between the different components on the system. Further, due to the complexity of such systems, problems involving communication between system components can be difficult to locate.

SUMMARY

In general, in one aspect, the invention relates to a system that includes a model engine and a graphing engine. The model engine is configured to obtain a context managed entity from a client system, query a managed entity repository to obtain a plurality of managed entities linked to the context managed entity, wherein the plurality of managed entities comprises a software managed entity and a hardware managed entity, generate a node in a topology model object for each of the plurality of managed entities, and generate a link object in the topology model object for each relationship between managed entities in the plurality of managed entities. The graphing engine is configured to obtain the topology model object from the model engine, and rendering a topology graph comprising each node and each link object in the topology model object.

In general, in one aspect, the invention relates to a method for visualizing a system. The method includes obtaining a context managed entity from a client system, wherein the context managed entity corresponds to software executing on a computer system, querying a managed entity repository to obtain a plurality of managed entities linked to the context managed entity, wherein the plurality of managed entities comprises a software managed entity and a hardware managed entity, and generating a node in a topology model object for each of the plurality of managed entities. The method further includes generating a link object in the topology model object for each link between managed entities in the plurality of managed entities and rendering a topology graph comprising each node and each link object in the topology model object.

In general, in one aspect, the invention relates to a non-transitory computer readable medium comprising instructions that, when executed by a processor, perform a method. The method includes obtaining a context managed entity from a client system, wherein the context managed entity corresponds to software executing on a computer system, querying a managed entity repository to obtain a plurality of managed entities linked to the context managed entity, wherein the plurality of managed entities comprises a software managed entity and a hardware managed entity, and generating a node in a topology model object for each of the plurality of managed entities. The method further includes generating a link object in the topology model object for each link between managed entities in the plurality of managed entities and rendering a topology graph comprising each node and each link object in the topology model object.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for visualizing and monitoring a complex enterprise-level system of computers. Specifically, embodiments of the invention may be used to generate a visual depiction of a complex system of computers from data describing the system. Further, embodiments of the invention may be used to depict relationships among and between both hardware and software components of the system. Such relationships may include depictions of hardware components containing other hardware components and/or software components, as well as software components containing other software components.

Further, embodiments of the invention may provide an interactive model of the system of computers. Specifically, embodiments of the invention may allow a user to search, select, filter, open, close, view details about, and move nodes on the visualized graph. Nodes (hardware or software) may be expanded to view other nodes that are contained or running on that node.

An interactive model generated by embodiments of the invention may be built around a context node that remains centered as nodes are expended and collapsed. Additionally, the orientation of the graph may be changed (for example; flowing from top down to left to right).

The interactive model may also include the ability to search through the information within the graph. Searching may include a find operation performed for a managed entity that may be collapsed by a containment or routing relationship (and therefore not present visually on the display), but available in the graph data. The searched-for managed entity may be made visible by recursively expanding both the route and containers to which the entity belongs. The entity may then be highlighted and placed in the center of the graph so that the user can visually see the managed entity more easily.

Figure 1:
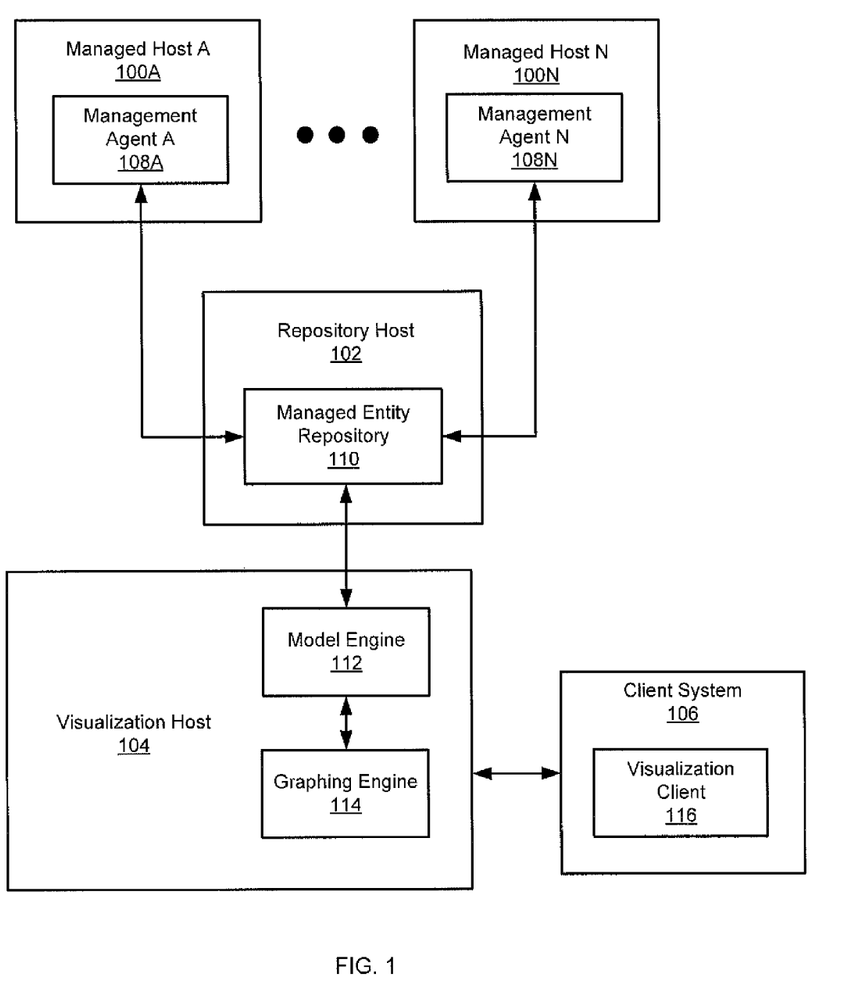
FIG. 1 shows a system in accordance with one or more embodiments of the invention.

FIG. 1 shows a diagram of a system in accordance with one or more embodiments of the invention. As shown in FIG. 1, the system includes multiple managed hosts (managed host A (100A), managed host N (100N)), a repository host (102), a visualization host (104), and a client system (106). Each managed host (managed host A (100A), managed host N (100N)) includes a management agent (management agent A (108A), management agent N (108N)), which provides data to the managed entity repository (110) on the repository host (102). The visualization host (104) includes a model engine (112) and a graphing engine (114). The client system (106) includes a visualization client (116).

In one or more embodiments of the invention, a managed entity is a software or hardware component of a managed system. One example of a managed entity is a managed host (managed host A (100A), managed host N (100N)). In one or more embodiments of the invention, each managed host (managed host A (100A), managed host N (100N)) is a physical computer system executing one or more software managed entities. Each managed host (managed host A (100A), managed host N (100N)) may be communicatively coupled to one or more managed hosts (managed host A (100A), managed host N (100N)).

In one or more embodiments of the invention, each managed host (managed host A (100A), managed host N (100N)) includes a management agent (management agent A (108A), management agent N (108N)). Each management agent (management agent A (108A), management agent N (108N)) is configured to gather information about the managed host (managed host A (100A), managed host N (100N)). Such information may include the software managed entities executing on the managed host (managed host A (100A), managed host N (100N)). In one embodiment of the invention, the management agent (management agent A (108A), management agent N (108N)) is distinct from the one or more software managed entities executing on the managed host (managed host A (100A), managed host N (100N)).

In one or more embodiments of the invention, the repository host (102) is a physical computer system(s) configured to store the managed entity repository (110). The repository host (102) may also include a process or group of processes configured to service requests for managed entity entries stored in the managed entity repository (110). Further, the repository host (102) may include a process or group of processes configured to interact with the management agents (management agent A (108A), management agent N (108N)) to obtain information about the managed entities executing on each managed host (managed host A (100A), managed host N (100N)).

In one or more embodiments of the invention, the managed entity repository (110) is a collection of data describing the managed host (managed host A (100A), managed host N (100N)) and the managed entities executing thereon (not shown). Detail regarding the managed entity repository (110) is provided in FIG. 2.

In one or more embodiments of the invention, the visualization host (104) is a physical computer system(s) configured to execute the model engine (112) and the graphing engine (114). In one or more embodiments of the invention, the model engine (112) is a process or group of processes configured to generate a topology model object. Specifically, in one embodiment of the invention, the model engine is configured to obtain a context managed entity and view type from a client system (106) and generate a topology model object for use by the graphing engine (114) to generate topology graph. Further detail regarding the model engine (112) is provided in FIG. 3.

In one or more embodiments of the invention, the graphing engine (114) is a process or group of processes configured to obtain a topology model object from the model engine (112) and render a topology graph for display by the visualization client (116). In one embodiment of the invention, the graphing engine (114) is executing on a computer system(s) separate from the computer system(s) executing the model engine (112). Further detail regarding the graphing engine (114) is provided in FIG. 4.

In one or more embodiments of the invention, the client system (106) is a physical computer system(s) configured to execute the visualization client (116). The client system (106) may be implemented, for example, as a desktop computer, laptop computer, tablet computer, or smartphone. In one or more embodiments of the invention, the visualization client (116) is a process or group of processes configured to obtain a rendered topology graph from the visualization host (104) and present the topology graph to a user of the client system (106).

Figure 2:
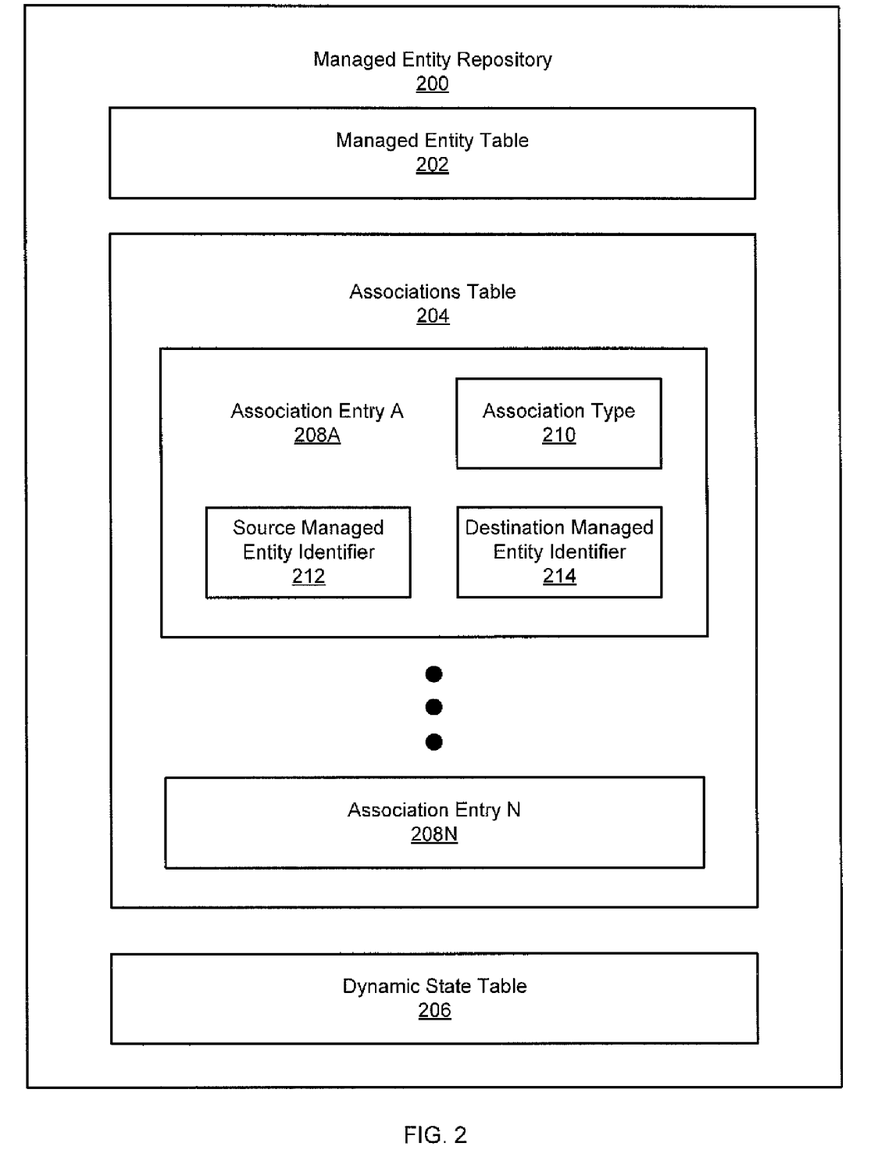
FIG. 2 shows a system in accordance with one or more embodiments of the invention.

FIG. 2 shows a managed entity repository in accordance with one or more embodiments of the invention. As shown in FIG. 2, the managed entity repository (200) includes a managed entity table (202), an associations table (204), and a dynamic state table (206). The associations table (204) includes multiple managed association entries (association entry A (208A), association entry N (208N). Each association entry (association entry A (208A), association entry N (208N) includes an association type (210), a source managed entity identifier (212), and a destination managed entity identifier (214).

In one or more embodiments of the invention, the managed entity table (202) stores entries for each hardware and software managed entity. Specifically, each managed entity table (202) entry contains data describing the associated managed entity. In one embodiment of the invention, such data may include, but is not limited to, a name associated with the entity, a unique identifier, and an entity type (e.g., firewall, 64-bit server, redundant systems, real application cluster databases, analytics application, etc.).

In one or more embodiments of the invention, the associations table (204) stores relationships between managed entities. In one embodiment of the invention, the associations table (204) stores different types of relationships between managed entities. In one embodiment of the invention, the associations table (204) stores routing relationships and containment relationships. In one embodiment of the invention, a hierarchical relationship between two managed entities where one entity makes up a part of a larger managed entity is described as a containment relationship. In one embodiment of the invention, two distinct managed entities that exchange data are referred to as sharing a routing relationship. In one embodiment of the invention, other types of relationships not described here may be stored in the associations table (204).

In one or more embodiments of the invention, each entry in the associations table (204) includes an association type (210) (e.g., routing relationship or containment relationship), a source managed entity identifier (212), and a destination managed entity identifier (214). The source managed entity identifier (212) and the destination managed entity identifier (214) may be stored using the unique identifier of the managed entity, as stored in the managed entity table (202).

In one or more embodiments of the invention, the dynamic state table (206) stores information about the current operating state of each managed entity. Specifically, the dynamic state table (206) may provide information regarding irregular or improper operating states of each managed entity. Such information may include alerts, errors, warnings, or exceptions provided by systems monitoring the associated managed entity. Such notifications may be generated and provided by a system separate and distinct from the system being monitored. In one embodiment of the invention, each entry in the dynamic state table (206) is updated as issues with the associated managed entities arise and are, if possible, resolved.

Figure 3:
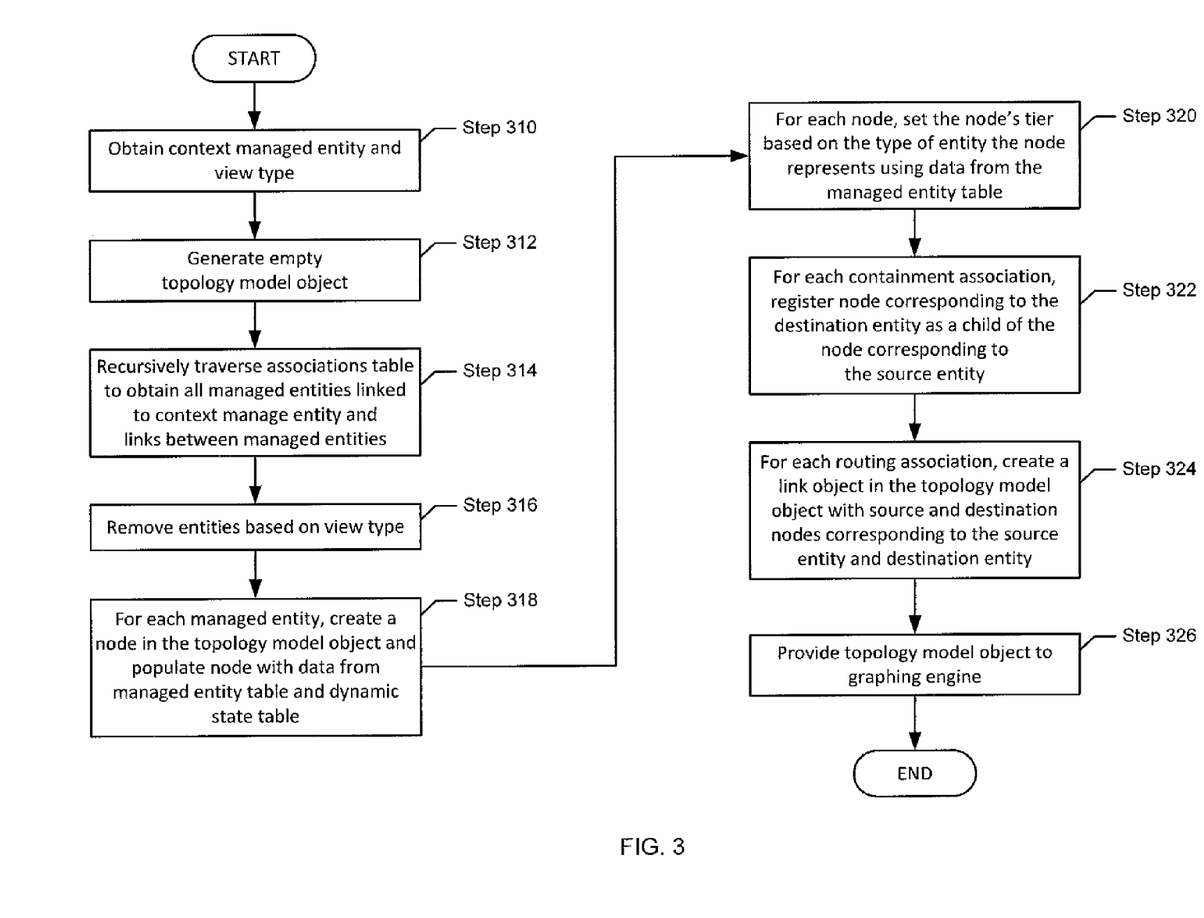
FIG. 3 shows a flow diagram in accordance with one or more embodiments of the invention.

FIG. 3 shows a flowchart for generating a topology model object in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the model engine obtains a context managed entity and view type. In one embodiment of the invention, the context managed entity is a managed entity passed to the model engine in response to a selection by a user of a client system. Specifically, the context managed entity is the managed entity that the user has indicated a primary interest for the purposes of generating the rendered topology graph.

In one embodiment of the invention, the view type is an indication by the user of the configuration of topology graph requested. In one embodiment of the invention, one view type is an application view. In one embodiment of the invention, an application view presents a topology graph focused on application managed entities, and may exclude entities such as application servers, clusters, and host entities. In one embodiment of the invention, another view type is a middleware view. In one embodiment of the invention, a middleware view presents a topology graph focused on middleware managed entities, and may exclude only host entities. In one embodiment of the invention, another view type is a host view. In one embodiment of the invention, a host presents a topology graph focused on host managed entities (i.e., managed hosts), and may exclude clusters.

In Step 312, the model engine generates an empty topology model object. In Step 314, the model engine recursively traverses the associations table to obtain all managed entities linked (directly and indirectly) to the context manage entity, as well as the types of relationships between those entities. In Step 316, the model engine removes certain managed entities from the gathered list of managed entities based on the view type.

In Step 318, the model engine creates a node in the topology model object for each managed entity remaining from the gathered list of managed entities. In one embodiment of the invention, a node is a representation of a managed entity or application type. A node may represent hardware (such as a managed host) or software (such as an application). In one embodiment of the invention, for an application view type, nodes corresponding to an application type are also generated. Also at Step 318, the node is populated with data from the managed entity table and dynamic state table. In Step 320, each node's tier is set based on the type of entity the node represents. In one embodiment of the invention, managed entities may be organized into one of three tiers based on the type of entity: a web tier, a middleware tier, and a database tier.

In Step 322, for each containment association encountered in Step 314, the node corresponding to the destination entity is registered as the child node of the node corresponding to the source entity. In one embodiment of the invention, containment associations define the way in which nodes are nested within a node group container. In one embodiment of the invention, when generating a topology model object using the application view type, additional nodes are generated for application types, and nodes corresponding to an application managed entity are registered as children of the node representing the application type. In Step 324, a link object is created in the topology model object for each routing relationship encountered in Step 314, with the source and destination nodes corresponding to the source entity and destination entity. In Step 326, the topology model object is provided to the graphing engine.

Figure 4:
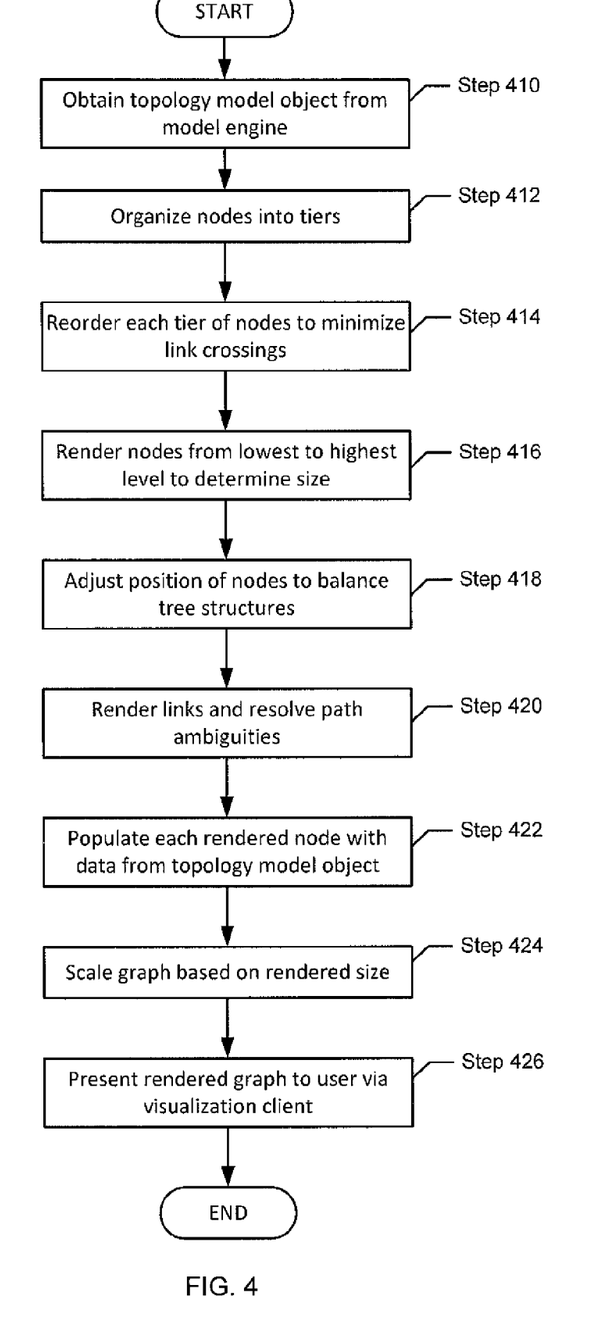
FIG. 4 shows a flow diagram in accordance with one or more embodiments of the invention.

FIG. 4 shows a flowchart for rendering a topology model object in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 410, the graphing engine receives the topology model object from the model engine. In Step 412, the graphing engine organizes the nodes in the topology model object into tiers. In one embodiment of the invention, each managed entity corresponding to a node in the topology model object is associated with a tier (e.g., a web tier, a middleware tier, or a database tier). In one embodiment of the invention, nodes that share the same tier are rendered in a single column of managed entities.

In Step 414, each tier is reorganized to minimize link crossings. Specifically, the order of nodes in each tier is adjusted such that links to other nodes in other tiers can be rendered with as few links crossing one another as practicable. In one embodiment of the invention, the nesting level of a node relates to its containment depth. Unnested nodes and outermost containers will have the lowest nesting level, while nodes that are embedded deepest within containers have the highest nesting level. In Step 416, each node is pre-rendered to determine the size of the graph, beginning with the innermost contained node (i.e., a child node or nodes that do not contain other children nodes).

In Step 418, the position of the nodes in each tier is further adjusted to balance tree structures. Specifically, the tree structures generated from nodes nested within one another (i.e., multiple containment links) are balanced by changing the position of nodes with multiple generations of child nodes relative to nodes with fewer generations of child nodes or without any children nodes.

In Step 420, the links are rendered and link ambiguities are resolved. Specifically, some links may be rendered such that the resulting graph may appear to contain links between nodes that do not actually share a link. For example, links may be rendered between two nodes separated by a third unlinked node. In such a case, the link may be redrawn around the unlinked node to avoid the appearance that the two linked nodes are also linked to the third node.

In Step 422, each rendered node is populated with data from the topology model object. Specifically, information originally obtained from the managed entity table and the dynamic state table is added to the node. In Step 424, the graph is scaled based on the final size of the rendered nodes. In Step 426, the graph is rendered by rendering the nodes from lowest to highest nesting level in order to reveal nested nodes in opened containers. Also in Step 426, the rendered graph is presented to a user via the visualization client. In one embodiment of the invention, the rendered graph is displayed on a mobile computing device, such as a tablet computer or smartphone.

Figure 5A:
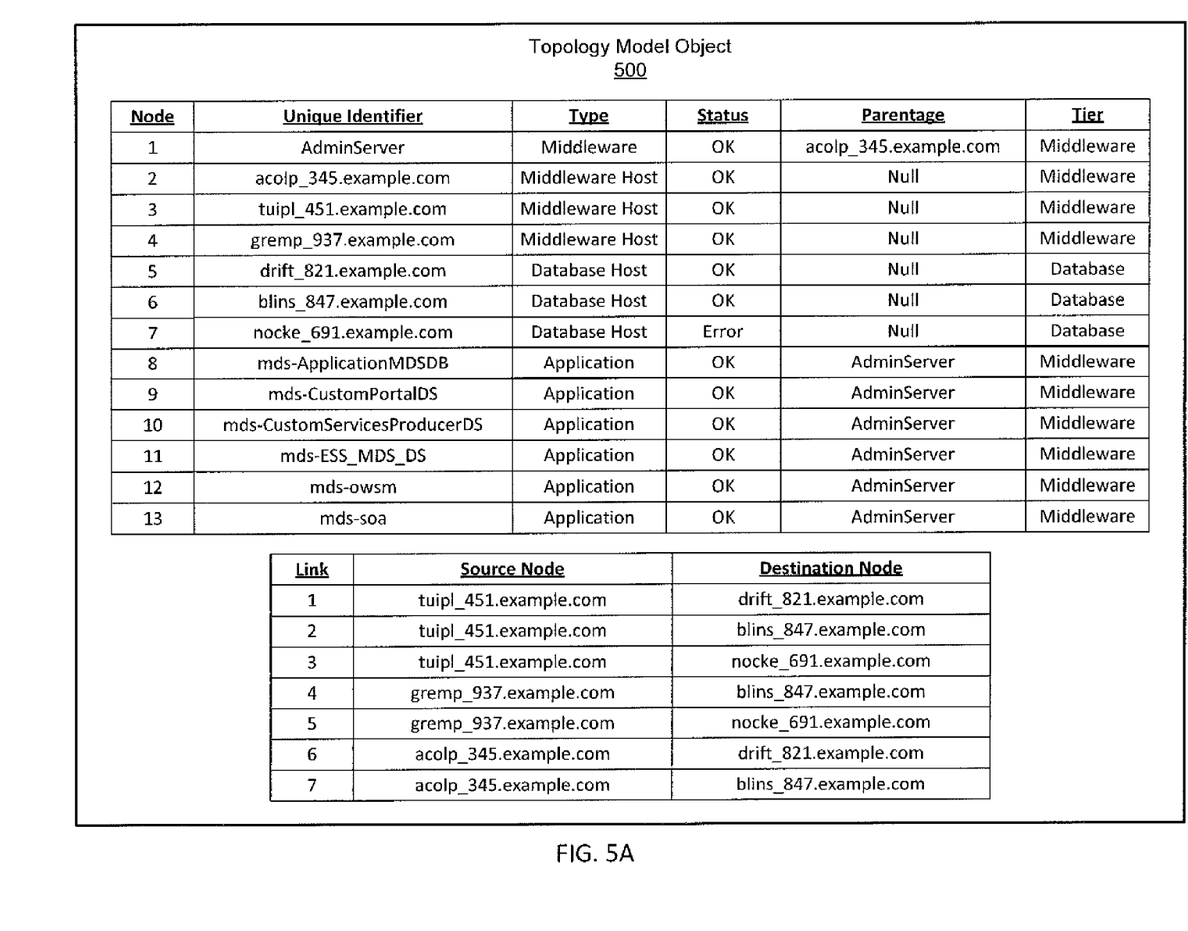
FIGS. 5A-5C show an example in accordance with one or more embodiments of the invention.

FIGS. 5A-7B show examples in accordance with one or more embodiments of the invention. The examples are not intended to limit the scope of the invention. FIG. 5A shows an example of a topology model object in accordance with one or more embodiments of the invention. As shown in FIG. 5A, the topology model object (500) includes a set of nodes and links generated by a model engine using the process outlined in FIG. 3.

Specifically, FIG. 5A shows the resulting topology model object from a model engine receiving AdminServer as the context managed entity and host view as the view type. Nodes in the topology model object were created for each managed entity linked (directly or indirectly) to AdminServer, and managed entities representing clusters were excluded. Data from the managed entity repository was added to each node, including unique identifier, type, and status. The tier of each node was set according to the obtained managed entity type. Finally, containment relationships were used to determine any existing parentage associations between nodes. FIG. 5A also shows a set of link objects representing routing links between managed entities. As shown in FIG. 5A, each link object includes a source node and a destination node.

Figure 5B:
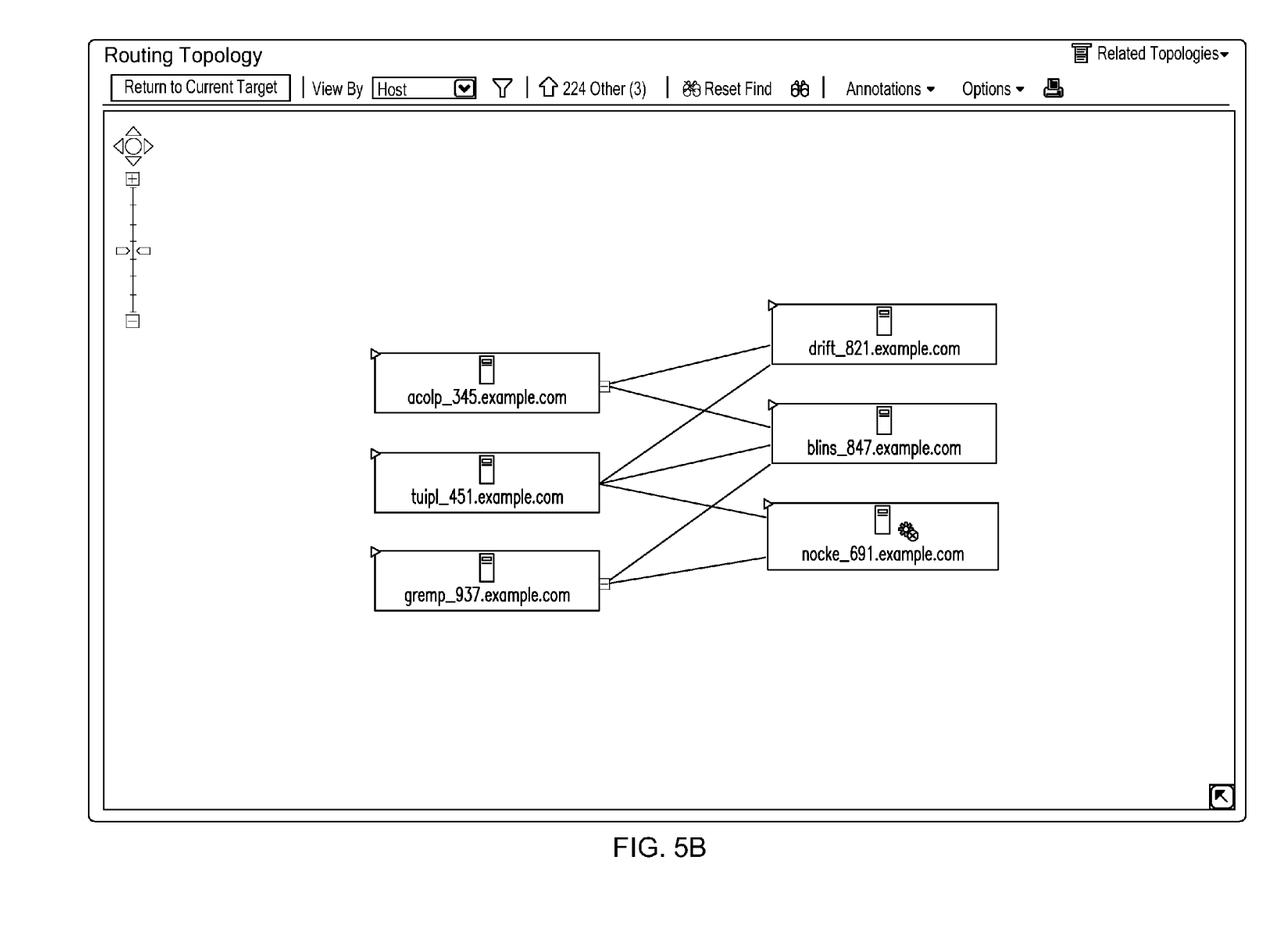
Figure 5C:
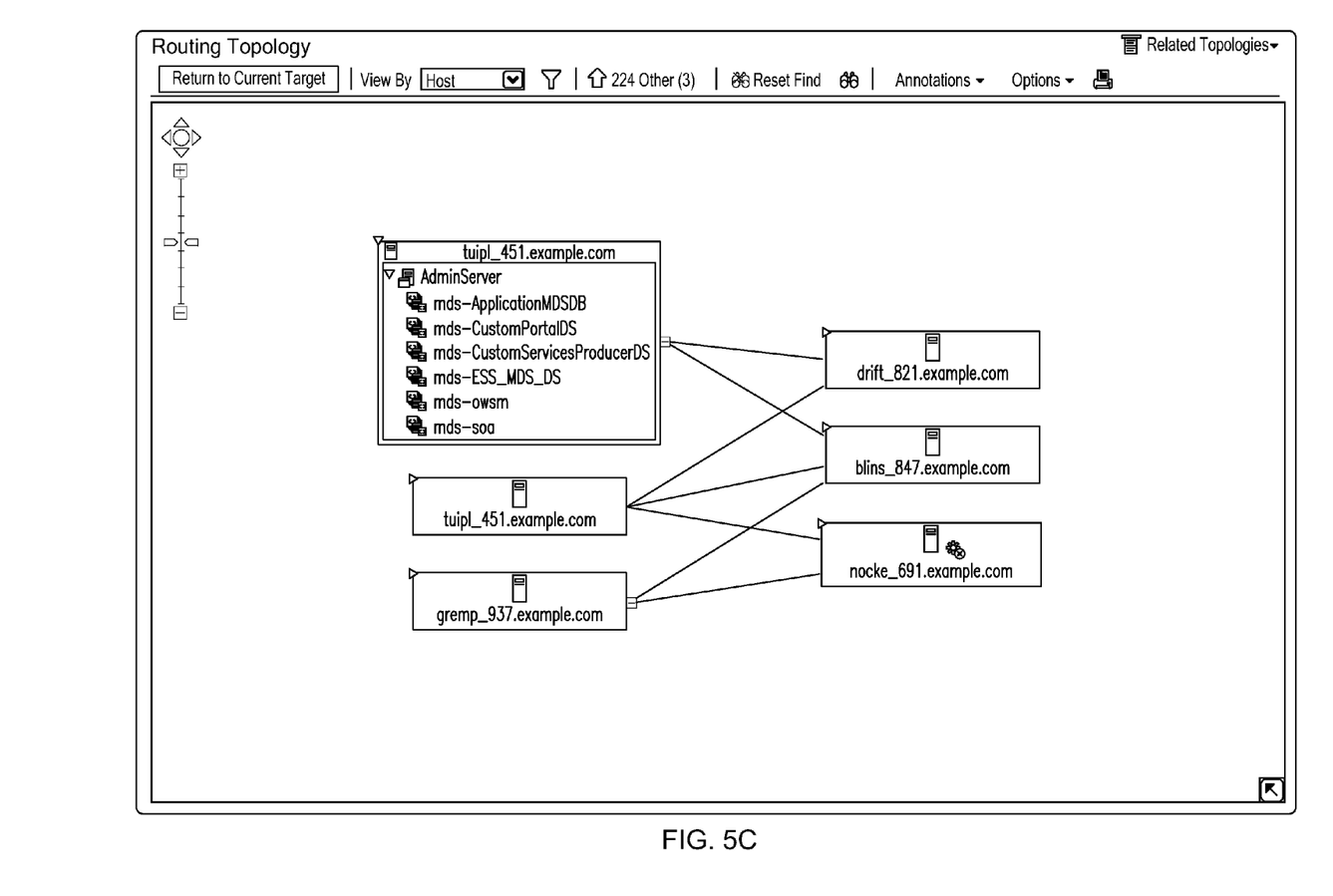

FIGS. 5B and 5C show examples of graphs rendered from the topology model object depicted in FIG. 5A. As shown in FIGS. 5B and 5C, the nodes are organized into two tier columns: a middleware tier that includes acolp_345.example.com, tuipl_451.example.com, and gremp_937.example.com, and a database tier that includes drift_821.example.com, blins_847.example.com, and nocke_691.example.com. The nodes representing managed hosts tuipl_451.example.com and blins_847.example.com were placed in the middle of the tier to minimize link crossings. The nodes were rendered to determine the total size, and the position of the nodes was adjusted to balance the tree structure. The links were rendered and ambiguities were resolved (no ambiguities existed in the example of FIGS. 5B and 5C). Each node was subsequently populated with data in the topology model object, including the error detected on nocke_691.example.com. Finally, the entire graph was scaled before being presented to a user via a visualization client. Note that FIG. 5C shows the same graph as FIG. 5B after acolp_345.example.com has been expanded to show the context managed entity (AdminServer) and its child nodes.

Figure 6A:
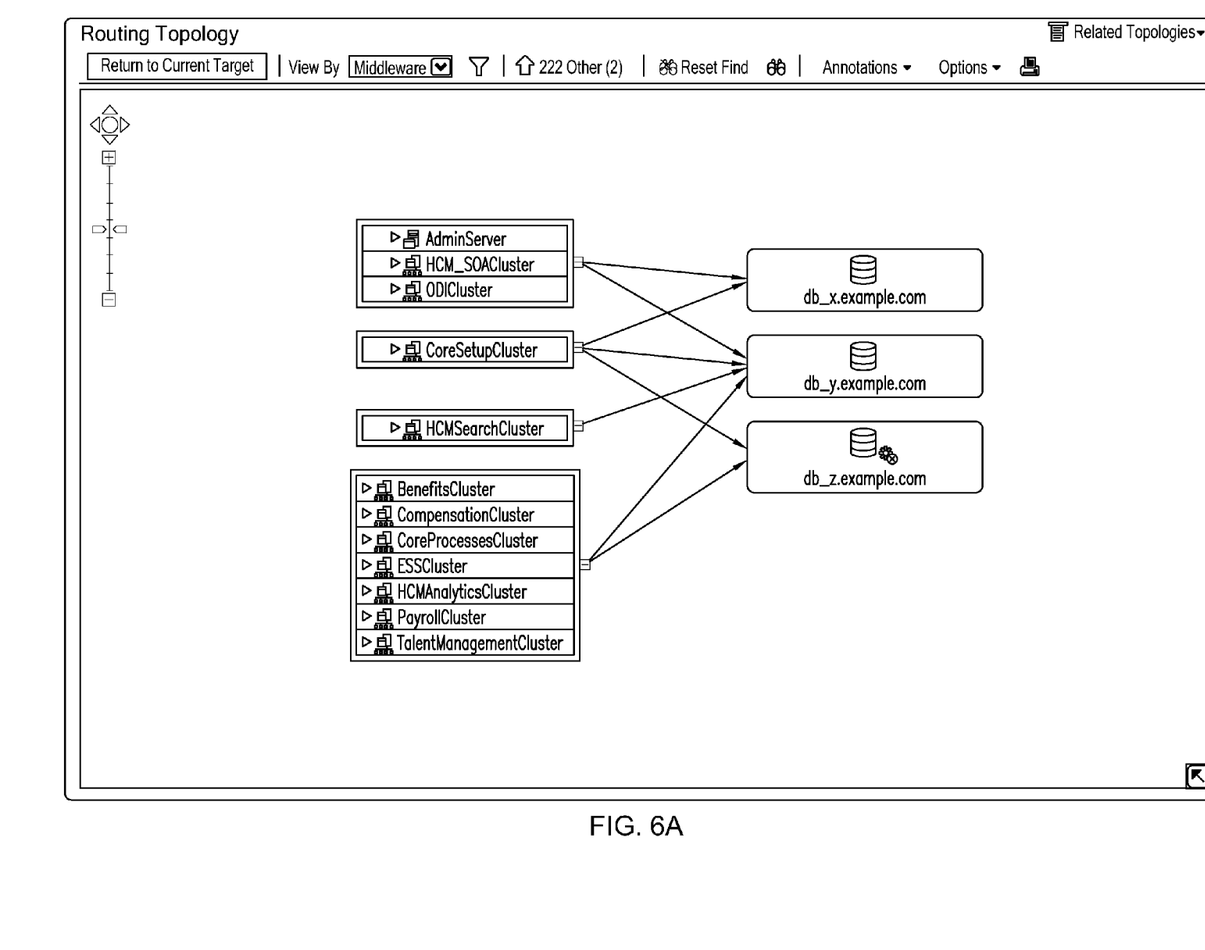
FIGS. 6A-6B show an example in accordance with one or more embodiments of the invention.
Figure 6B:
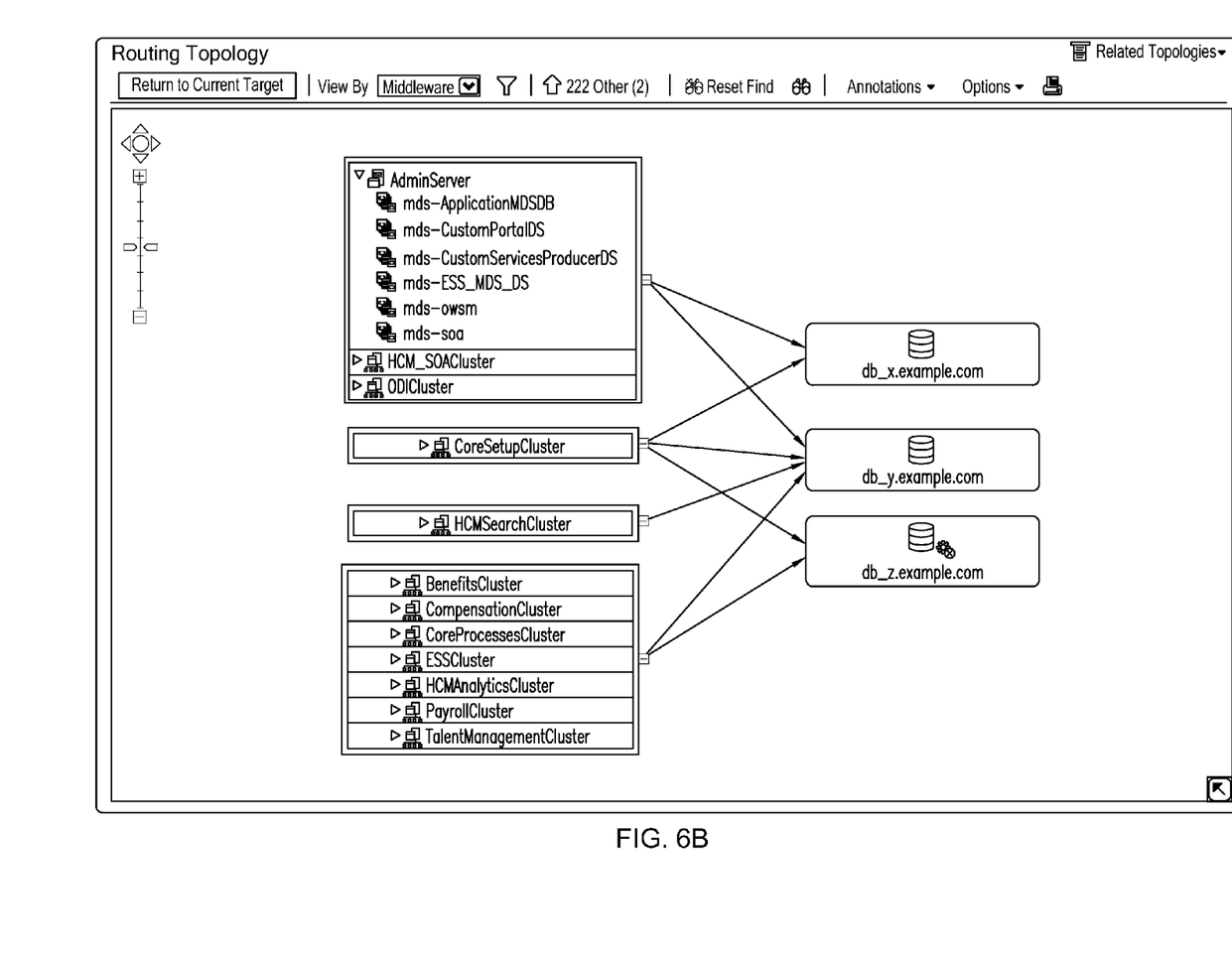

FIGS. 6A and 6B show a middleware view graph from the same source repository data and context managed entity (AdminServer). FIGS. 6A and 6B show the middleware view and, accordingly, have excluded host entities and included clusters. Like FIGS. 5B and 5C, FIGS. 6A and 6B show a middleware tier and a database tier.

As discussed above, containment associations define the way in which nodes are nested within a node group container. In the example shown in FIG. 6A, the nodes 'AdminServer', 'HCM_SOACluster', and 'ODICluster' are grouped together and rendered close to one another inside a rectangular region. A containment relationship would instruct the graphing engine to place these three nodes within the rectangular region.

Figure 7A:
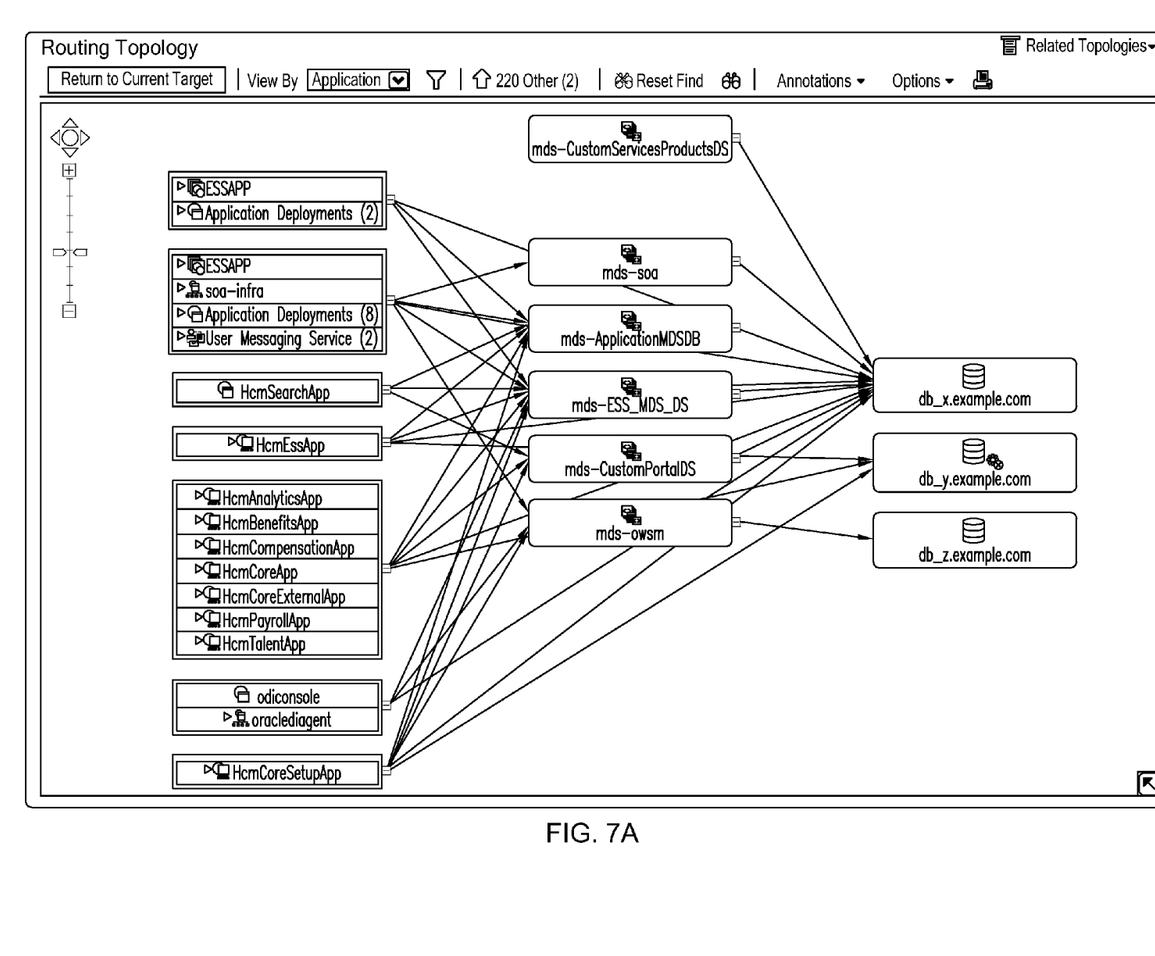
FIGS. 7A-7B show an example in accordance with one or more embodiments of the invention.
Figure 7B:
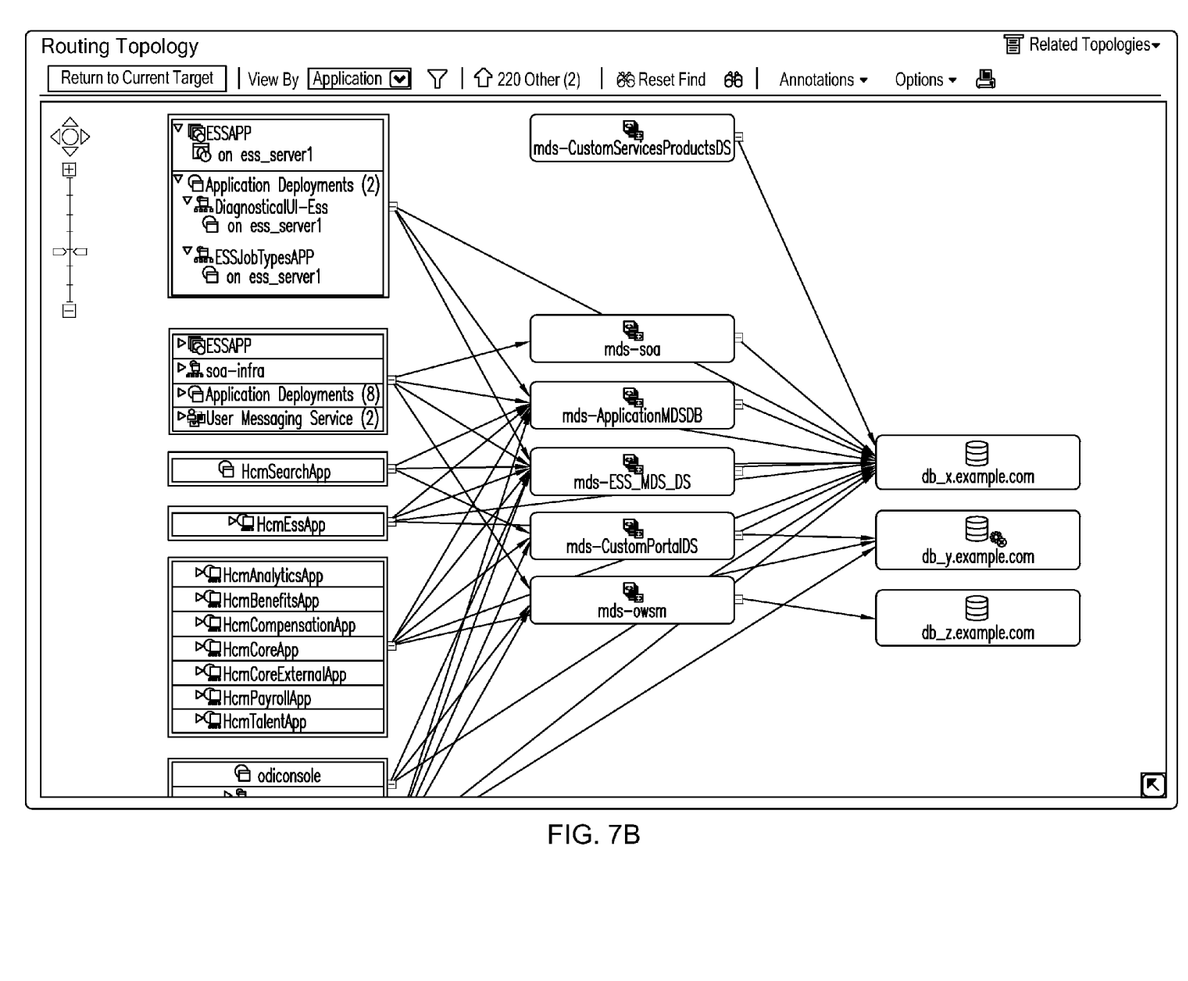

FIGS. 7A and 7B show an application view graph from the same source repository data but a different context managed entity (ESSAPP). FIGS. 7A and 7B show the application view and, accordingly, have excluded host entities, clusters, and application servers. 7A and 7B show a middleware tier, a database tier, and a web tier. Additionally, nodes in FIGS. 7A and 7B have been created for application types, and application managed entities have been registered as children of the associated application type nodes (e.g., application deployments and user messaging services).

Figure 8:
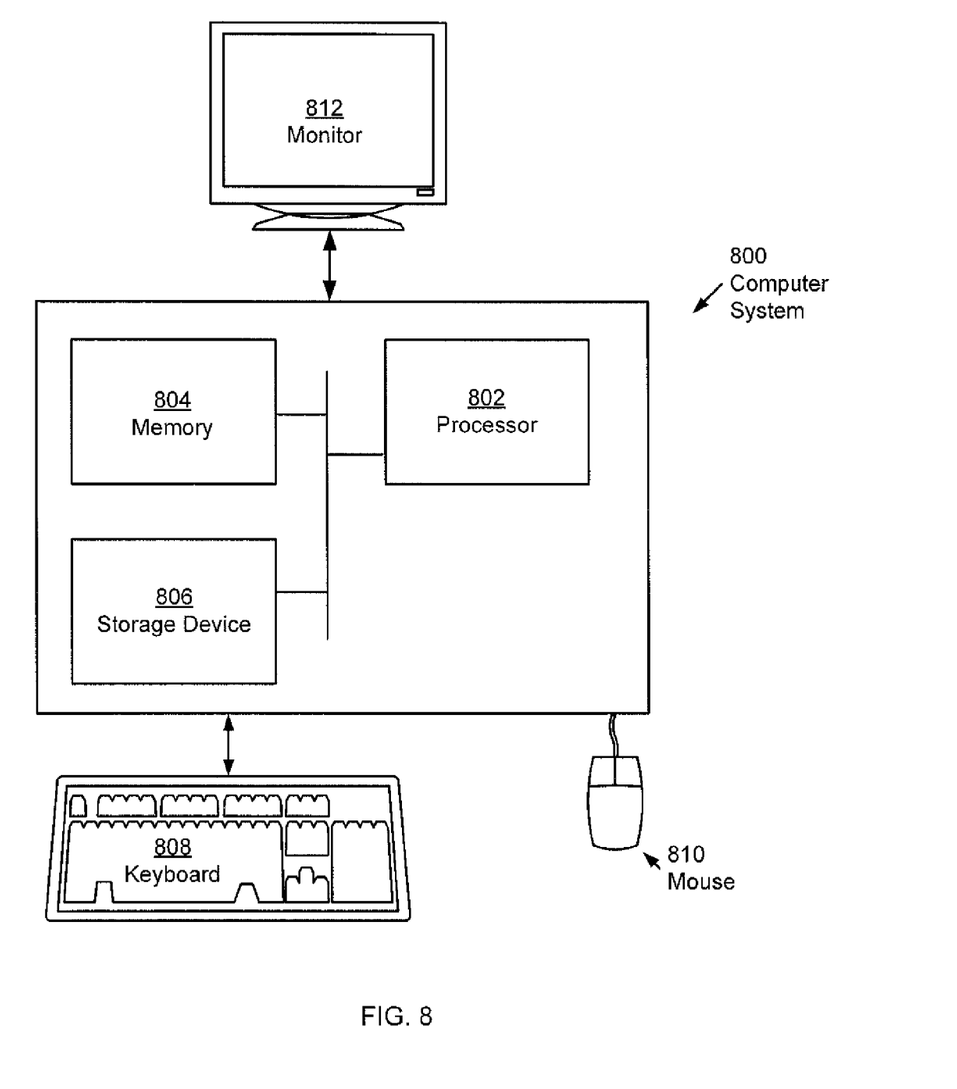
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802) such as a central processing unit (CPU) or other hardware processor(s), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a memory;
a computer processor;
a model engine executing on the computer processor and configured to:
obtain a context managed entity from a client system;
query a managed entity repository to obtain a plurality of managed entities linked to the context managed entity, wherein the plurality of managed entities comprises a software managed entity, a first hardware managed entity, and a second hardware managed entity;

generate a node in a topology model object for each of the plurality of managed entities; and generate a plurality of link objects in the topology model object for a plurality of relationships between the plurality of managed entities, wherein the plurality of link objects comprises a containment link object; and a graphing engine executing on the computer processor and configured to:

obtain the topology model object from the model engine;

render a topology graph comprising each node and each link object in the topology model object by arranging each node into tiers; and expand the containment link object in the topology graph to show a containment link between the first hardware managed entity nesting as a hardware component within the second hardware managed entity.

2. The system of claim 1,
wherein the tiers comprise a web tier, a middleware tier, and a database tier.

3. The system of claim 1, wherein the model engine is further configured to:

exclude at least one managed entity from the plurality of managed entities based on a view type received from the client system.

4. The system of claim 1, wherein the managed entity repository comprises a managed entity table, an associations table, and a dynamic state table.

5. The system of claim 1, wherein at least one of the plurality of managed entities is linked to the context managed entity via one selected from a group consisting of a routing link and a containment link.

6. The system of claim 1, wherein the hardware managed entity is a host.

7. The system of claim 1, wherein the software managed entity is one selected from a group consisting of middleware, a database, and an application.

8. A method for visualizing a system comprising:

obtaining a context managed entity from a client system, wherein the context managed entity corresponds to software executing on a computer system;

querying a managed entity repository to obtain a plurality of managed entities linked to the context managed entity, wherein the plurality of managed entities comprises a software managed entity, a first hardware managed entity, and a second hardware managed entity;

generating a node in a topology model object for the plurality of managed entities;

generating a plurality of link objects in the topology model object for a plurality of relationships between the plurality of managed entities, wherein the plurality of link objects comprises a containment link object; and rendering a topology graph comprising each node and each link object in the topology model object by arranging the nodes into tiers; and expanding the containment link object in the topology graph to show a containment link between the first hardware managed entity nesting as a hardware component within the second hardware managed entity.

9. The method of claim 8,
wherein the tiers comprise a web tier, a middleware tier, and a database tier.

10. The method of claim 8, wherein the model engine is further configured to:

exclude at least one managed entity from the plurality of managed entities based on a view type received from the client system.

11. The method of claim 8, wherein the managed entity repository comprises a managed entity table, an associations table, and a dynamic state table.

12. The method of claim 8, wherein at least one of the plurality of managed entities is linked to the context managed entity via one selected from a group consisting of a routing link and a containment link.

13. The method of claim 8, wherein the hardware managed entity is a host.

14. The method of claim 8, wherein the software managed entity is one selected from a group consisting of middleware, a database, and an application.

15. A non-transitory computer readable medium comprising instructions that, when executed by a processor, perform a method, the method comprising:

obtaining a context managed entity from a client system, wherein the context managed entity corresponds to software executing on a computer system;

querying a managed entity repository to obtain a plurality of managed entities linked to the context managed entity, wherein the plurality of managed entities comprises a software managed entity, a first hardware managed entity, and a second hardware managed entity;

generating a node in a topology model object for each of the plurality of managed entities;

generating a plurality of link objects in the topology model object for a plurality of relationships between the plurality of managed entities, wherein the plurality of link objects comprises a containment link object;

rendering a topology graph comprising each node and each link object in the topology model object by arranging the nodes into tiers; and expanding the containment link object in the topology graph to show a containment link between the first hardware managed entity nesting as a hardware component within the second hardware managed entity.

16. The non-transitory computer readable medium of claim 15, wherein the tiers comprise a web tier, a middleware tier, and a database tier.

17. The non-transitory computer readable medium of claim 15, wherein the model engine is further configured to:

exclude at least one managed entity from the plurality of managed entities based on a view type received from the client system.

18. The non-transitory computer readable medium of claim 15, wherein the managed entity repository comprises a managed entity table, an associations table, and a dynamic state table.

19. The non-transitory computer readable medium of claim 15, wherein at least one of the plurality of managed entities is linked to the context managed entity via one selected from a group consisting of a routing link and a containment link.

20. The non-transitory computer readable medium of claim 15, wherein the hardware managed entity is a host.

* * * * *

UNITED STATES PATENT AND TRADEMARK OFFICE
CERTIFICATE OF CORRECTION

PATENT NO. : 9,164,965 B2  
APPLICATION NO. : 13/630752  
DATED : October 20, 2015  
INVENTOR(S) : Molesky et al.

It is certified that error appears in the above-identified patent and that said Letters Patent is hereby corrected as shown below:

In the claims

Column 9, line 52, claim 8, delete "object; and" and insert -- object; --, therefor.

Signed and Sealed this
Seventh Day of June, 2016

Michelle K. Lee
*Director of the United States Patent and Trademark Office*